(12) United States Patent
Braunschweiler

(10) Patent No.: US 6,637,828 B2
(45) Date of Patent: Oct. 28, 2003

(54) WHEEL CONSTRUCTION, IN PARTICULAR FOR AUTOMOBILES

(75) Inventor: Hans George Braunschweiler, Rüschlikon (CH)

(73) Assignee: Kuhl Wheels, LLC, Los Gatos, CA (US)

( * ) Notice: Subject to any disclaimer, the term of this patent is extended or adjusted under 35 U.S.C. 154(b) by 0 days.

(21) Appl. No.: 09/847,521

(22) Filed: May 3, 2001

(65) Prior Publication Data

US 2002/0003374 A1 Jan. 10, 2002

Related U.S. Application Data

(63) Continuation-in-part of application No. 09/053,439, filed as application No. PCT/CH97/00398 on Oct. 23, 1997, now Pat. No. 6,244,669.

(30) Foreign Application Priority Data

Nov. 5, 1996 (CH) .............................................. 2726/96
Jan. 23, 1997 (CH) .............................................. 138/97
Apr. 25, 1997 (CH) .............................................. 975/97

(51) Int. Cl.⁷ ................................................. B60B 1/00
(52) U.S. Cl. ...................... 301/35.54; 301/79; 301/104
(58) Field of Search ........................ 301/35.54, 35.59, 301/55, 57, 59, 79, 80, 84, 104

(56) References Cited

U.S. PATENT DOCUMENTS

| 4,918 A | * | 1/1847 | Holmes |
| 47,780 A | | 5/1865 | Murphy |
| 160,268 A | | 3/1875 | Hodges |
| 458,573 A | * | 9/1891 | Gedge |
| 514,624 A | * | 2/1894 | King et al. |
| 693,347 A | | 2/1902 | Cullers |
| 1,127,271 A | * | 2/1915 | Mitchell |
| 1,134,674 A | | 4/1915 | Ellis |
| 1,179,975 A | * | 4/1916 | Strietelmeier |
| 1,227,852 A | * | 5/1917 | Strietelmeier |
| 1,365,181 A | | 1/1921 | Marzak et al. |
| 1,414,013 A | * | 4/1922 | Foster |
| 1,457,538 A | * | 6/1923 | Mark et al. |
| 1,548,230 A | | 8/1925 | Wade |
| 1,559,673 A | * | 11/1925 | Carnahan |
| 1,588,494 A | * | 6/1926 | Putnam |
| 1,612,050 A | * | 12/1926 | Putnam |
| 1,657,703 A | | 1/1928 | Wagenhorst |
| 1,701,325 A | | 2/1929 | Hahner |
| 1,711,628 A | | 5/1929 | Williams |
| 1,718,916 A | * | 6/1929 | Baker |
| 2,206,230 A | | 7/1940 | Maccabee |
| 2,890,911 A | | 6/1959 | Schilberg |
| 2,916,329 A | * | 12/1959 | Gilbert |
| 3,465,804 A | | 9/1969 | Dupre |
| 3,917,352 A | | 11/1975 | Gageby |
| 3,950,033 A | | 4/1976 | Wilcox |
| 5,707,114 A | | 1/1998 | Schlanger |
| 6,042,194 A | * | 3/2000 | Fitz et al. |
| 6,439,671 B1 | * | 8/2002 | Lehnhardt et al. ............ 301/84 |

FOREIGN PATENT DOCUMENTS

| DE | 202614 | 10/1907 |
| DE | 633369 | 7/1936 |
| DE | 803 743 | 4/1951 |
| DE | 26 40 843 | 3/1978 |
| FR | 335.258 | 1/1904 |
| FR | 366.221 | 9/1906 |
| FR | 507.112 | 9/1920 |
| FR | 525.584 | 9/1921 |
| FR | 871.788 | 5/1942 |
| FR | 2 676 397 | 11/1992 |
| GB | 198440 | 6/1923 |
| WO | WO 98/19874 | 5/1998 |

* cited by examiner

Primary Examiner—Russell D. Stormer
(74) Attorney, Agent, or Firm—Morgan, Lewis & Bockius LLP

(57) ABSTRACT

In the wheel structure according to the invention, at least one and preferably several profile elements (2.1) are used for the transmission of forces between hub (1) and rim (3). Said parts (1.2, 1.3) are combined or combinable into an intrinsically stiff structure. The structure is particularly suitable for car wheels.

25 Claims, 16 Drawing Sheets a)

b)

c)

d)

e)

WHEEL CONSTRUCTION, IN PARTICULAR FOR AUTOMOBILES

This application is a continuation-in-part of U.S. patent application Ser. No. 09/053,439, now U.S. Pat. No. 6,244,669 filed Apr. 1, 1998, which was a national stage application of PCT International Patent Application No. PCT/CH97/00398 filed Oct. 23, 1997, both of which are hereby incorporated by reference.

TECHNICAL FIELD

The present invention relates to a wheel structure, particularly for cars, having a hub, rim and spoke system, the spoke system having at least one profile element for transmitting forces between the hub and rim.

The term spoke system is here to be understood in the broadest sense and covers all constructional means positioned between the hub and rim and used for transmitting forces between them. The hub is located in the centre of the wheel structure and is the connecting member to the axle structure. It can be substantially fixed to the spoke system and detachably fixed to the axle structure for wheel change purposes, or conversely can be detachably connected to the spoke system and substantially fixed to the axle structure. In addition, parts of the hub can be located on the spoke system and detachably connected with further hub parts on the axle structure. Unless the term rim is placed within inverted commas hereinafter when it also includes at least the spoke system, it is merely understood to mean the outer ring of the wheel, which carries the tire.

The forces acting on wheel structures and their individual components occur radially between the hub and rim as a result of the vehicle weight, as well as the dynamic loads on travelling over unevennesses or potholes. During acceleration and deceleration tangential forces occur between the rim and hub. When taking curves axial forces must be added thereto which attempt to bend the hub and rim out of their parallel position to one another. For the transmission of these forces, particularly the radial forces, elements such as spokes or disks (solid or interrupted) are used. The most varied combinations of these elements have arisen due to the weight, price and ventilation, as well as esthetic effects.

PRIOR ART

In the car sector the most widely used is the so-called "steel rim", because it is manufacturable in a technically functional and inexpensive manner. However, from the optical standpoint it does not have a particularly attractive appearance. The spoke system, which in the case of steel rims comprises a drawn steel sheet provided with openings or breaks and which is also known as a wheel disk, is consequently generally covered with a hubcap. A hub as a functionally independent part does not have a steel rim. In this case that part of the axle structure to which the steel rim is screwed is generally called a hub.

To an ever increasing extent steel rims are being replaced by so-called "light metal or alloy rims", because due to the material they have a lower weight, but in particular because the spoke system is or can be designed more attractively from the visual standpoint. In the case of "light metal rims" the spoke system is often constructed in one piece with the rim as a casting. As a design object and as a result of the casting mould required for their manufacture light metal or alloy rims are more expensive than steel rims. A different mould is required for each rim type and each rim size. A new mould is also required for each shape or design change. Therefore the market introduction costs for a new rim type are high.

FR 366,221 and FR 2 676 397 A1 disclose wheel structures having a spoke system with as the carrying element elastically deformable, i.e. resilient rings. As a result of the deformability of the rings the wheels are to be given an internal elasticity or resilience. A wheel structure with a fundamentally similar spoke system is known from U.S. Pat. No. 3,465,304.

DESCRIPTION OF THE INVENTION

Through the invention, as characterized in the claims, a wheel structure with a spoke system is provided which, in the case of an adequate stability, low weight and low material costs, can be easily and inexpensively manufactured, can be easily and widely varied and can be adapted to fashion trends.

The inventive spoke system, according to claim 1, comprises at least one profile element for transmitting forces between the hub and rim, said parts, unlike in the aforementioned, known constructions, being joined together to form an intrinsically stiff structure or, particularly if the hub or parts of the hub are added to the axle structure, can be joined together.

The term "stiff" is here understood to mean that the wheel structure is virtually undeformed under the forces and torques acting thereon, or at least no more or not significantly more than is the case with the known "steel or light metal rims". Unlike in the case of the standard travel strokes of existing cars and which amount to 10 cm in the region of the wheel suspension and still 3 cm in the region of the tire, the allowable deformations are only a few millimeters.

Modern wheel structures are subject to various, usually standardized tests. The most severe of these tests is the rotary bending test, in which the wheel is fixed to a bench and to its hub is fixed an approximately 1 m long bar. The free end thereof is then deflected for a predetermined time in circular manner, whilst applying a clearly defined force. Without the aforementioned stiffness, it would not be possible to pass this test.

The profile elements can advantageously be cut from long solid, half or hollow profile or section bars (so-called semifinished products), which already have the desired cross-sectional shape. By modern separation or cutting methods, such as e.g. laser cutting, this can be performed in such a way that no reworking is necessary. Possible cross-sectional shapes are particularly U or V-shapes, but also disks, rings, polygons and drops, together with combinations thereof. However, the profile elements can also be manufactured from sections of flat profiles or from flat stampings by rolling and/or bending.

Another advantage of using profile elements is the material characteristics thereof. As a result of the manner of their production in injection moulding or extrusion pressing processes, the crystals of the profile elements are uniformly oriented in the profile longitudinal direction. Compared with mouldings, such as e.g. modern "light metal rims", for which a substantially random crystal structure is typical, profile elements can be subject to higher loads or can be made more slender for the same loading.

The profile element or elements can be easily screwed to the hub and rim, as well as optionally adjacent profile elements. However, they could equally well be riveted to the hub and/or rim and/or to one another, or positively or integrally joined, the latter especially by welding.

The axial faces of the profile elements can be oriented in perpendicular manner and/or with an inclined angle with respect to the wheel axle. They can also be curved with respect thereto. Advantageously said angle changes on wheel fitting, so that an initial tension or preloading occurs in the wheel structure. However, an initial tension in the wheel structure can also be produced in fundamentally the same way during manufacture and can be retained by suitable measures. In particular as a result of an inclined or curved construction, the spoke system can also be adapted to the space requirements of the brake shoes of disk brakes. Several profile elements can be arranged in mutually axially displaced manner in several planes. The axial extension of the profile elements is preferably at least a multiple greater than the wall thickness thereof in the radial and/or circumferential direction.

According to another preferred embodiment the hub is constructed as a replaceable part. This allows adaptation to differently dimensioned mid-centrings of different manufacturers or vehicle types and/or a displacement of the so-called inset without replacing the wheel as a whole, which permits a considerable reduction in the multiplicity of wheel types.

A suitable material for the profile elements is steel or light metal (or a light metal alloy).

BRIEF DESCRIPTION OF THE DRAWINGS

The invention is described in greater detail hereinafter relative to non-limitative embodiments and with reference to the attached drawings, wherein show.

WAYS OF IMPLEMENTING THE INVENTION

Figure 1:
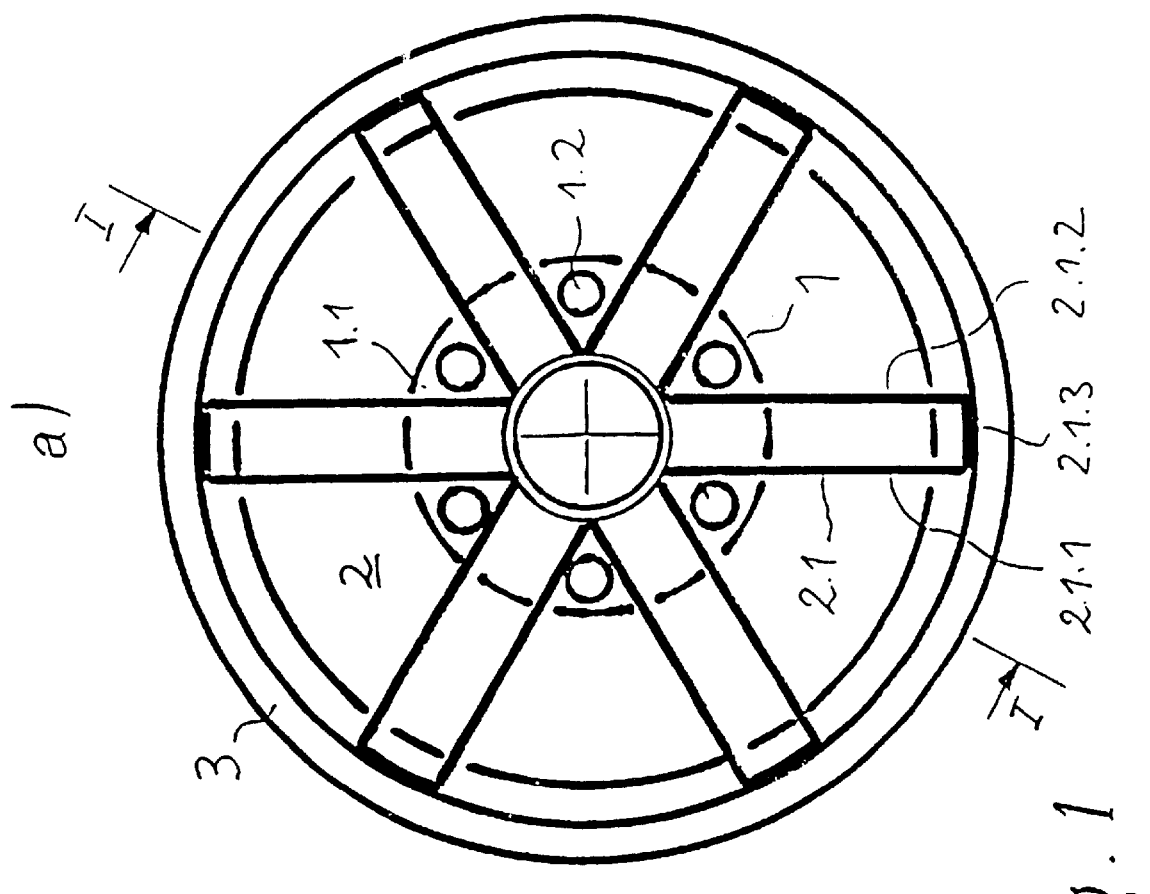
FIG. 1 Under a) a view and under b) a section I—I of a first, preferred embodiment of a car wheel structure according to the invention with several u-shaped profile elements.
Figure 1:
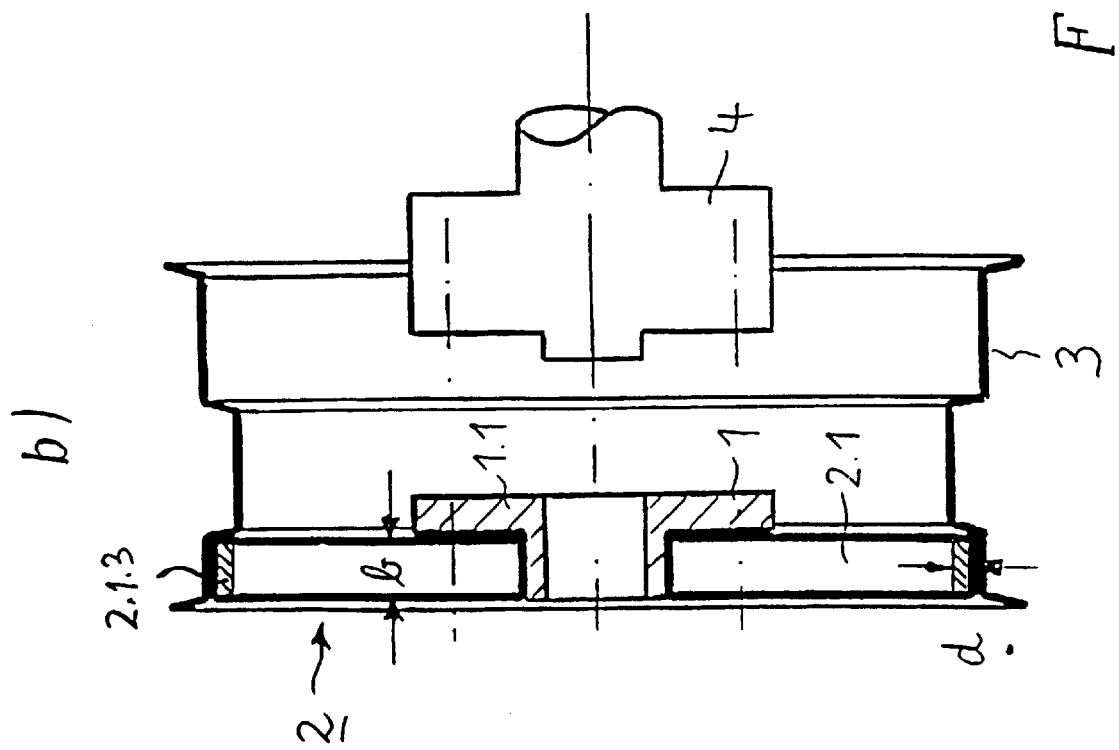

In the wheel structure according to FIG. 1, 1 is the hub, 2 the spoke system and 3 the rim. The tire has been omitted for simplification reasons and this also applies to all the other drawings. In a somewhat laterally displaced manner, 4 represents that part of the axle structure of a vehicle to which the hub 1 is fixed by screwing. In a ring flange-like part 1.1 for this purpose the hub 1 is provided with a ring of mounting holes, whereof one is designated 1.2.

The inventive spoke system comprises at least one profile element for transmitting forces between the hub and rim, said parts, unlike in the aforementioned, known constructions, being joined together to form an intrinsically stiff structure or, particularly if the hub or parts of the hub are added to the axle structure, can be joined together.

The term "stiff" is here understood to mean that the wheel structure is virtually undeformed under the forces and torques acting thereon, or at least no more or not significantly more than is the case with the known "steel or light metal rims." Unlike in the case of the standard travel strokes of existing cars and which amount to 10 cm in the region of the wheel suspension and still 3 cm in the region of the tyre, the allowable deformations are only a few millimeters.

The profile elements can advantageously be cut from long solid, half- or hollow-profile, or section bars (so-called semifinished products), which already have the desired cross-sectional shape. By modem separation or cutting methods, such as, e.g., laser cutting, this can be performed in such a way that no reworking is necessary. Possible cross-sectional shapes are particularly U- or V-shapes, but also disks, rings, polygons and drops, together with combinations thereof. However, the profile elements can also be manufactured from sections of flat profiles or from flat stampings by rolling and/or bending.

Another advantage of using profile elements is the material characteristics thereof. As a result of the manner of their production in injection moulding or extrusion pressing processes, the crystals of the profile elements are uniformly oriented in the profile longitudinal direction. Compared with mouldings, such as e.g. modem "light metal rims," for which a substantially random crystal structure is typical, profile elements can be subject to higher loads or can be made more slender for the same loading.

As can be gathered from FIG. 1a), the spoke system 2 comprises six u-shaped profile elements, whereof one is designated 2.1. The six u-shaped profile elements with their inwardly directed sides 2.1.1 and 2.1.2 are introduced between the hub 1 and rim 3, the connecting web 2.1.3 thereof engaging flat on the rim inside and the side ends are in contact with the hub 1 and optionally with one another by in each case adjacent ends. For their mutual fixing the aforementioned parts are welded and the contacting side ends are optionally welded together. Other connecting methods would naturally also be possible. Thus, in particular the connecting web 2.1.3 could also be screwed to the rim 3. The width b of the u-shaped profiles, i.e. their axial extension, is preferably significantly greater than their thickness d, e.g. by a factor of 10:1. When steel is used as the material for the profile elements 2.1, the width b could be in the range 20 to 50 mm and the thickness in the range 3 to 6 mm.

The desired high stiffness, particularly with respect to rotary bending moments of the aforementioned type (bending of the hub 1 from its parallel position with respect to the rim 3) is attained by the structure of FIG. 1 inter alia through the axially extended (width b) contact face of the connecting web 2.1.3 of the u-shaped profile elements 2.1 with the rim 3, as well as the also axially extended, linear contact of the ends of their two sides 2.1.1 and 2.1.2 with the hub 1, which can be clearly seen in the sectional representation of FIG. 1b). Said bending moments, but in particular a bending in the axial direction oppose the u-shaped profile elements 2.1 with a high geometrical moment of inertia due to the preferably large ratio of their width b to their thickness d. A further stiffening action is exerted by the partly lateral engagement of the profile elements on the ring flange-like part 1.1 of the hub 1 and with respect thereto, as is the case in certain of the following examples, it would additionally be possible to provide a fixed or detachable connection.

Figure 2:
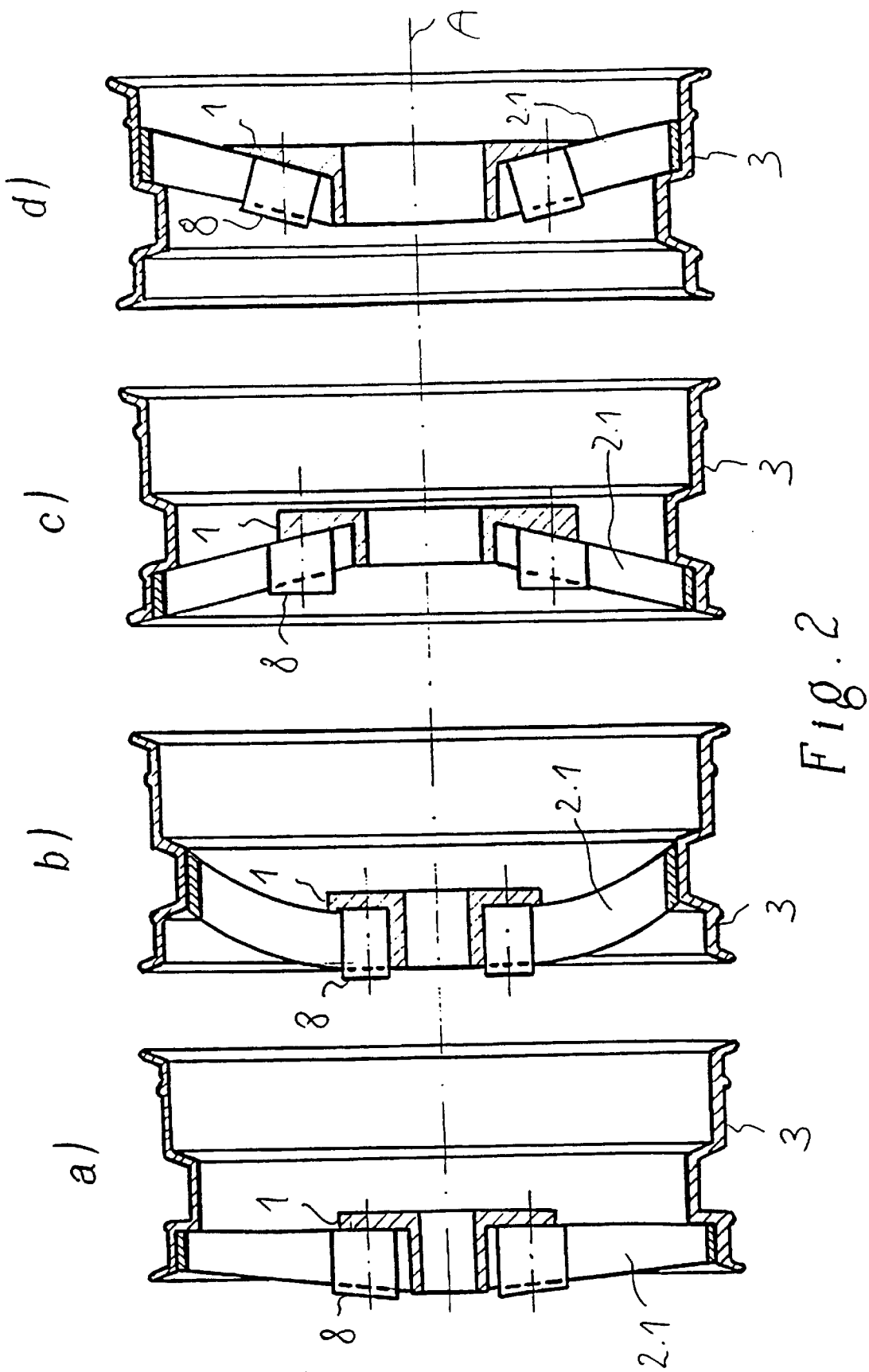
FIG. 2 Under a) to d) cross-sections through different wheel structures according to FIG. 1.

The sections of FIGS. 2a) to d) show that the axial end faces of the profile elements 2.1 are not necessarily straight (as in FIG. 1b)), but can also be oriented under an inclined angle with respect to the wheel axis A or can even be curved with respect thereto. The sections also reveal various possibilities of how and where the profile elements 2.1 can be connected to the hub 1 and rim 3. The connection of the profile elements 2.1 to the hub 1 is here detachable, using holding or retaining elements 8. This e.g. makes it possible to replace the hub 1 by another hub. The resulting advantage will be discussed further in conjunction with FIG. 11. In all the examples of FIG. 2 use is again made of an axially, considerably increased contact of the profile elements with the hub 1 and rim 3, in order to achieve the desired high stiffness for the complete construction. The examples also show that the axial position of the hub 1 relative to the rim 3 can be varied within wide limits and in this way account can easily be taken of the most varied demands, e.g. with respect to the inset or the space requirements for the brake shoes of disk brakes.

Figure 3:
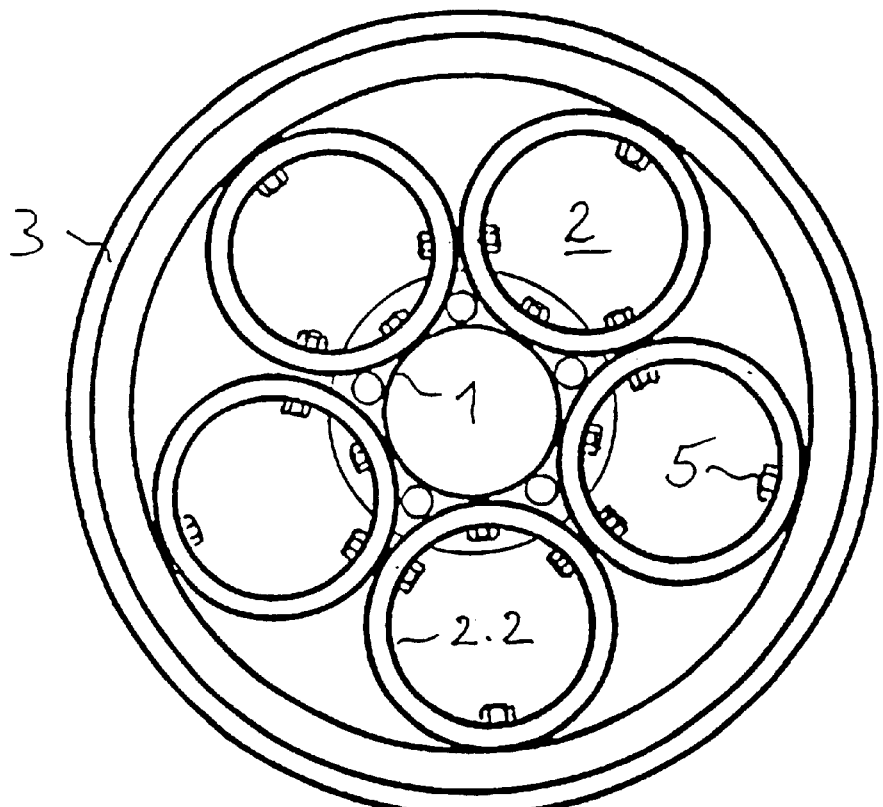
FIG. 3 Under a) an embodiment with several annular profile elements and under b) an embodiment in which the profile elements are constructed as gears.
Figure 3:
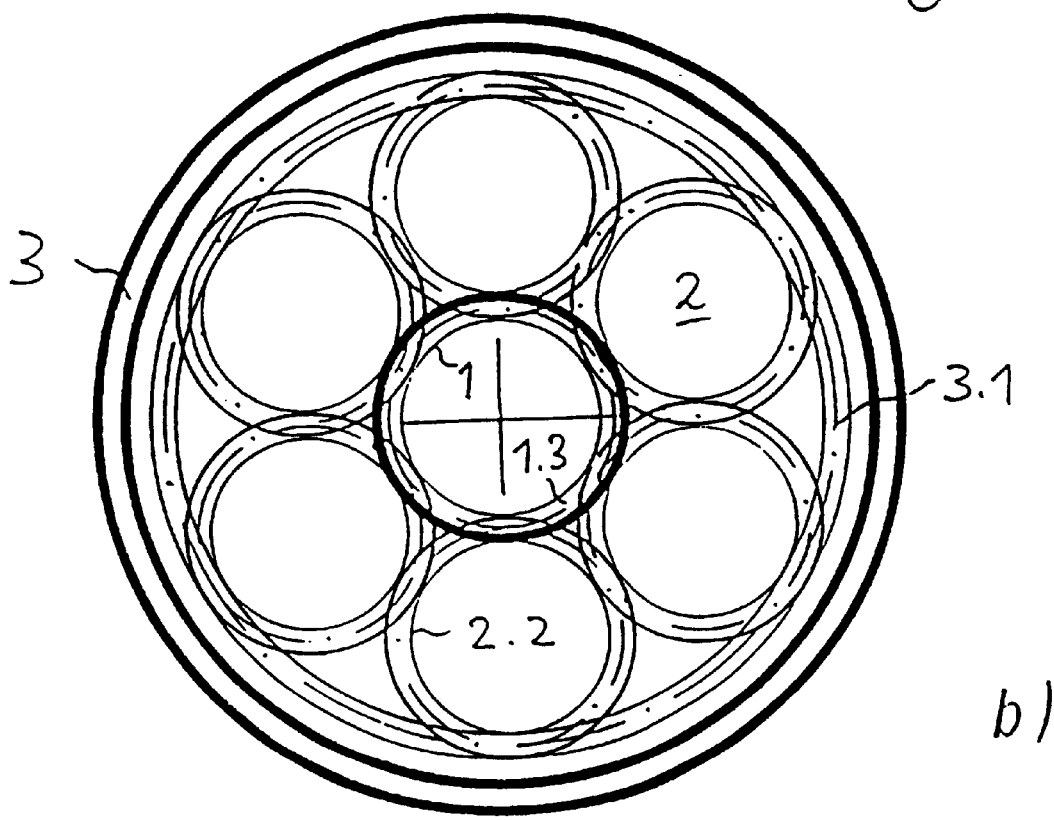

In the wheel structure of FIG. 3a), 1 is once again the hub, 2 the spoke system and 3 the rim. The spoke system 2 here comprises five circular profile elements, whereof one is designated 2.2 and which is inserted flush and with reciprocal contact between hub 1 and rim 3. The five profile elements 2.2 are in each case screwed to the hub 1 and rim 3, as well as to one another by means of screws, one of which is designated 5.

In the structure of FIG. 3a), loading of the wheel structure is always transmitted to the complete structure and absorbed by the latter. Significant deformations, displacements or rotations of individual profile elements 2.2 are impossible, because the in each case adjacent profile elements 2.2 prevent it. With increasing radial loading, there is e.g. a mutual self-locking of the profile elements 2.2 and consequently an internal stiffening. The connection points of the profile elements 2.2 to one another, as well as to the hub 1 and rim 3 are in particular exposed to compressive and shear forces. Relatively thin screws 5 can be adequate for absorbing these forces.

The example of FIG. 3a) shows that even profile elements such as circular rings, which considered intrinsically have an unfavourable deformation and rotation behaviour and which have not hitherto been used as spring elements in wheel structures, in a suitable union can behave in an advantageous manner for obtaining an overall, stiff structure. Naturally the wall thicknesses of the rings must be made adequately thick for this purpose.

In place of the screwing system shown in FIG. 3a), the profile elements 2.2 could also be riveted to the hub 1 and rim 3, as well as to one another, or could be integrally joined by welding or bonding. As the connection points are largely shear-stressed, it can also be sufficient to only have a positive engagement, as occurs between meshing gears. FIG. 3b) shows an embodiment, in which the profile elements are constructed as gears engaging in one another and in gear rims 1.3 or 3.1 on hub 1 and rim 3. One of the gears is again designated 2.2. In this embodiment it is particularly clear that the structure is self-locking with respect to the mutual rotation of its parts.

Figure 4:
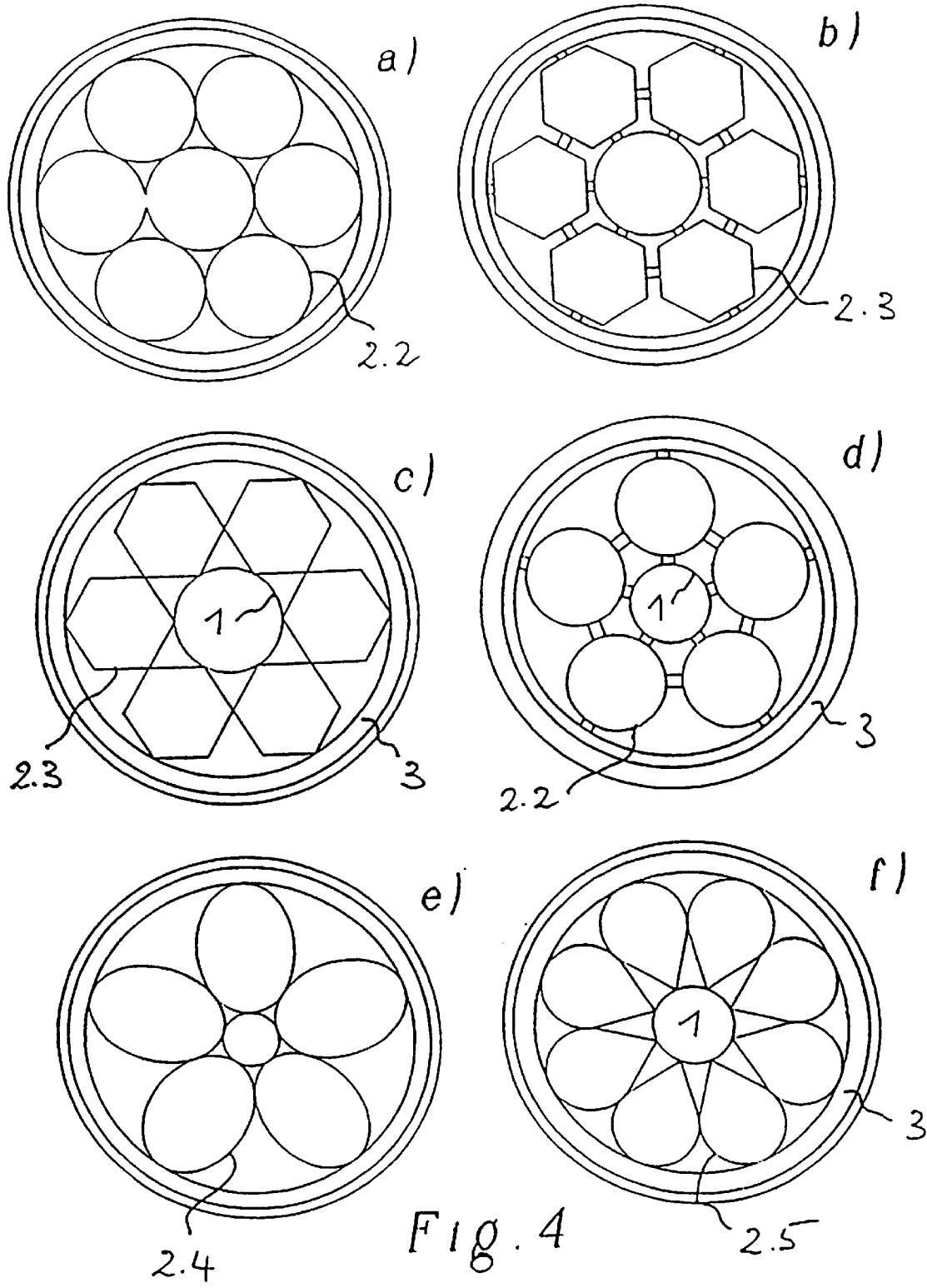
FIG. 4 Under a) to p) diagrammatic embodiments of inventive wheel structures with profile elements, which can be directly cut to length from rod-like solid, half or hollow profiles.
Figure 4:
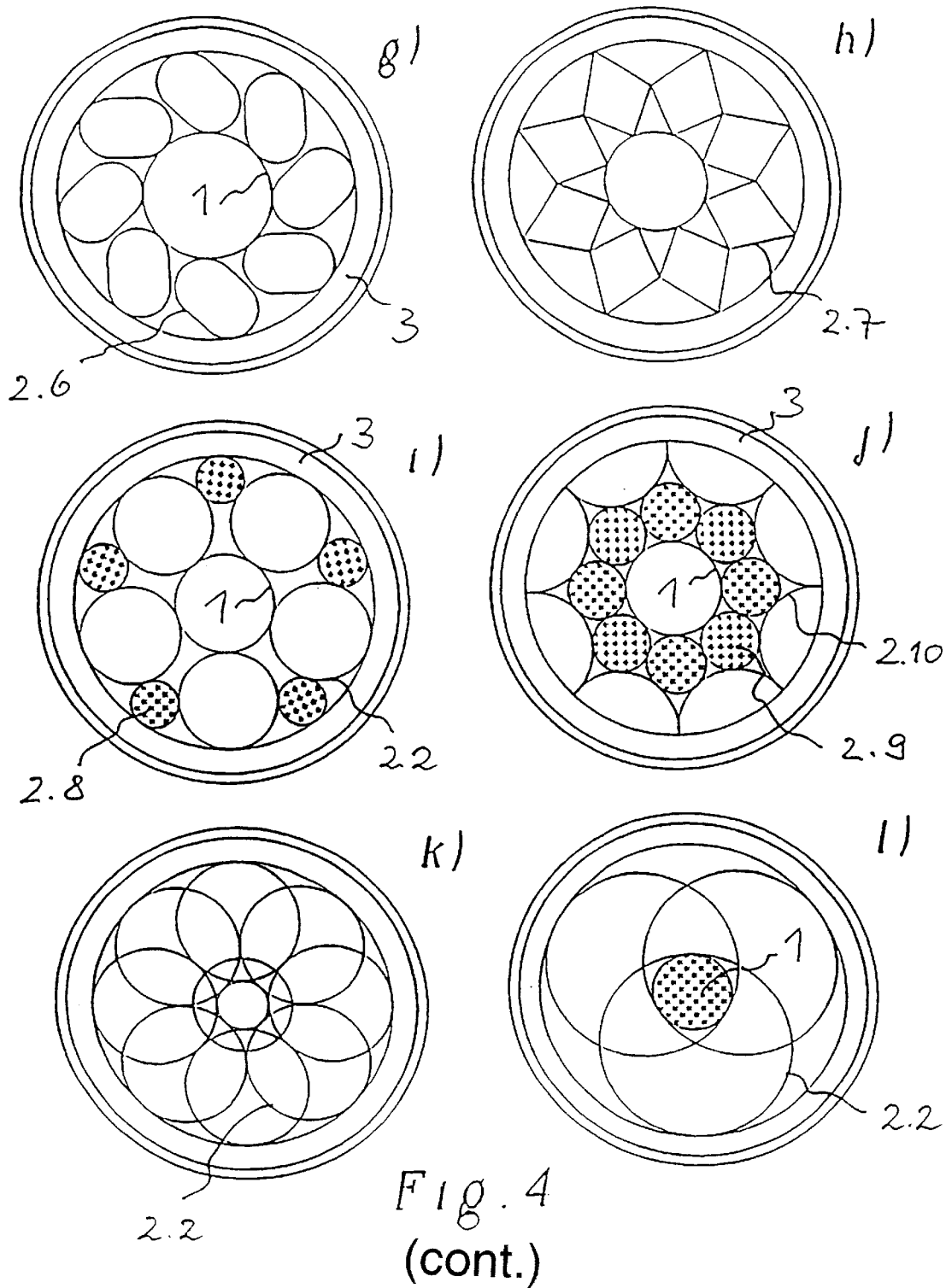
Figure 4:
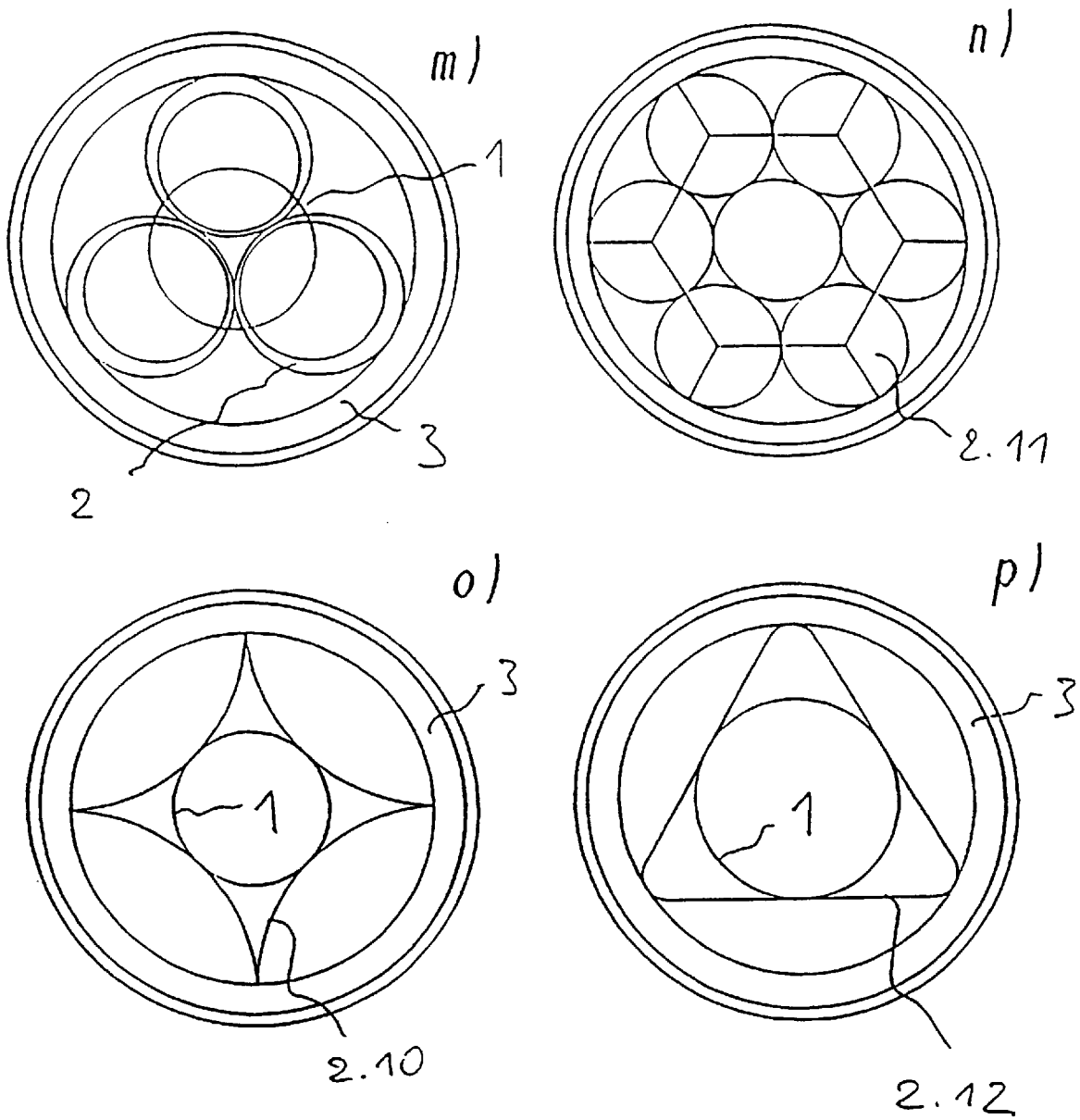

In FIG. 4 under a) to p) are diagrammatically shown other possible embodiments for inventive wheel structures, in which use is made of the aforementioned constructional principles in order to obtain a stiff structure.

The embodiment of FIG. 4a) corresponds to that of FIG. 3a), except that here there are six instead of five annular profile elements 2.2.

In FIG. 4b) the profile elements 2.3 are in each case hexagonal.

FIG. 4c) also uses hexagonal profile elements 2.3, but here they are oriented with their corners against one another, as well as against the hub 1 and rim 3. For the interconnection of the profile elements 2.3, welding is particularly advantageous. On hub 1 and rim 3 the corners or angles of the profile elements 2.3 could be positively fixed in grooves or notches.

In the embodiment of FIG. 4d), as in FIG. 3a), there are five circular profile elements 2.2, but their diameter is smaller than in FIG. 3a). For compensation purposes, between the profile elements 2.1 and between the latter and hub 1 and rim 3 are inserted short spacers.

The five profile elements 2.4 of FIG. 4e) have an elliptical shape, the ellipse major axis being placed in the radial direction.

The profile elements 2.5 of FIG. 4f) are drop-shaped, the drop tip being oriented towards the hub 1. A reverse arrangement would also be possible.

The embodiment of FIG. 4e) has eight oval profile elements 2.6, which in each case slope with respect to the radial direction between hub 1 and rim 3.

In the example of FIG. 4h) the eight profile elements 2.7 are rectangular, stability being increased by diverging from the square shape.

In the embodiment of FIG. 4l) profile elements 2.2 and 2.8 with two different diameters are combined. The profile elements 2.2 with the larger diameter are circular and connected to the hub 1 and rim 3. The profile elements 2.8 with the smaller diameter are circular disk-shaped and only connected to the rim 3.

The embodiment of FIG. 4j) shows a combination of circular, disk-shaped profile elements 2.9 arranged in a dense rim on the hub side and u-shaped half-profile elements 2.10 on the rim side. The circular disk-shaped profile elements 2.9 are here only connected to the hub 1 and the u-shaped half-profile elements 2.10 only to the rim 3, this connection being positively implementable by engagement in notches in the rim 3. With respect to this arrangement mention is made of the indirect connection of the individual spoke elements. The radial pressure of an element 2.9 in the outwards direction leads to a "squeezing away" of the u-shaped or arcuate half-profile elements 2.10 and consequently to a radially inwardly directed pressure of the adjacent elements 2.9.

In place of the solid disks 2.8 in FIG. 4l) or 2.9 in FIG. 4j), it would naturally also be possible to again use circular profile elements.

In the embodiment of FIG. 4k) there are eight circular ring-shaped profile elements 2.2 in mutually overlapping arrangement in two axially mutually displaced planes.

FIG. 4l) shows an embodiment with three axially mutually displaced, reciprocally overlapping, circular ring-shaped profile elements 2.2 embracing the hub 1.

In the embodiment of FIG. 4m) three circular ring-shaped profile elements 2.1 are inserted flush and in mutual contact between hub and rim. It is diagrammatically shown that the wall thickness of the profile elements is non-uniform over their circumference and is made thickest where the greatest loads are to be expected. Non-uniform wall thicknesses, adapted to the loads, could obviously be used in all other embodiments.

The embodiment of FIG. 4n) has been built up using six circular ring-shaped profile elements 2.11, which are in each case additionally stiffened by a radial profile. Other, particularly optically attractive stiffening profiles could also be adopted.

In the embodiment of FIG. 4o) the connection between hub 1 and rim 3 is produced solely by four u-shaped half-profile elements 2.10.

FIG. 4p) shows an example in which a single triangular profile element, surrounding the hub 1 is used.

Figure 5:
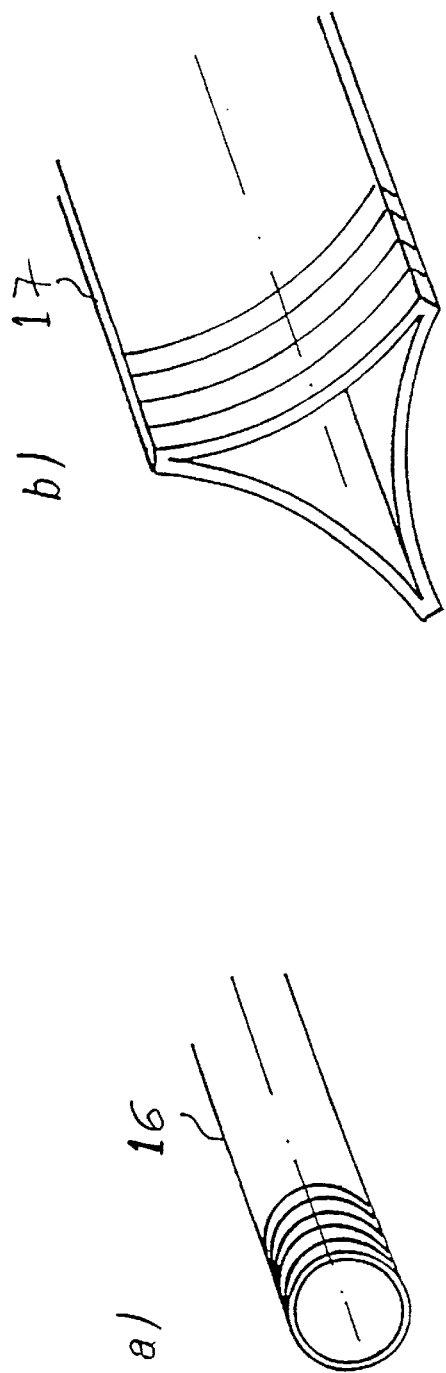
FIG. 5 Under a) and b) in perspective representation rod-like hollow profiles and under c) to f) examples for section lines for cutting the hollow profiles to length.
Figure 5:
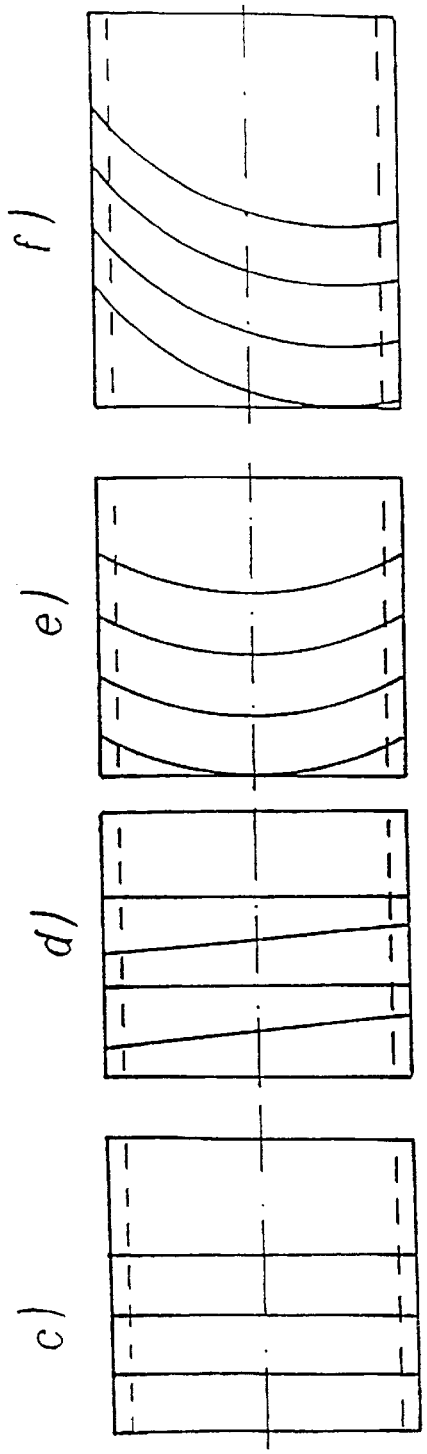

The profile elements used for the embodiments of FIGS. 1 to 4 can all be directly cut to length from bar-like solid, half or hollow profiles. FIG. 5 shows this under a) or b) using the example of two hollow profiles 6 and 7 and for producing straight, sloping and/or curved faces (cf. FIG. 2) cutting can take place in the most varied ways. Four examples of possible cutting lines are shown under c) to f) in FIG. 5.

With the exception of solid profiles such as disks 2.8 and 2.9 in FIGS. 4k) and 4l), the profile elements of FIGS. 1 to 4 could also be produced as flat, profile sections or flat stampings by rolling, bending and/or forging, as is illustrated relative to a circular profile element in FIG. 6a). The still open ring 2.2 of FIG. 6a) can e.g. be closed by welding its ends, but advantageously this only takes place on insertion between hub and rim. Specially shaped and longitudinally unequally wide stampings are obviously necessary, in order that by rolling and/or bending it is possible to produce profile elements with axial faces inclined or bent with respect to the axial direction. Further interesting shapes can be produced by rolling and/or bending from flat material, as is illustrated in exemplified manner in FIGS. 6b) to 6e). The production of u-shaped profile elements 2.1 according to FIG. 1 is also naturally possible in this way.

Figure 6:
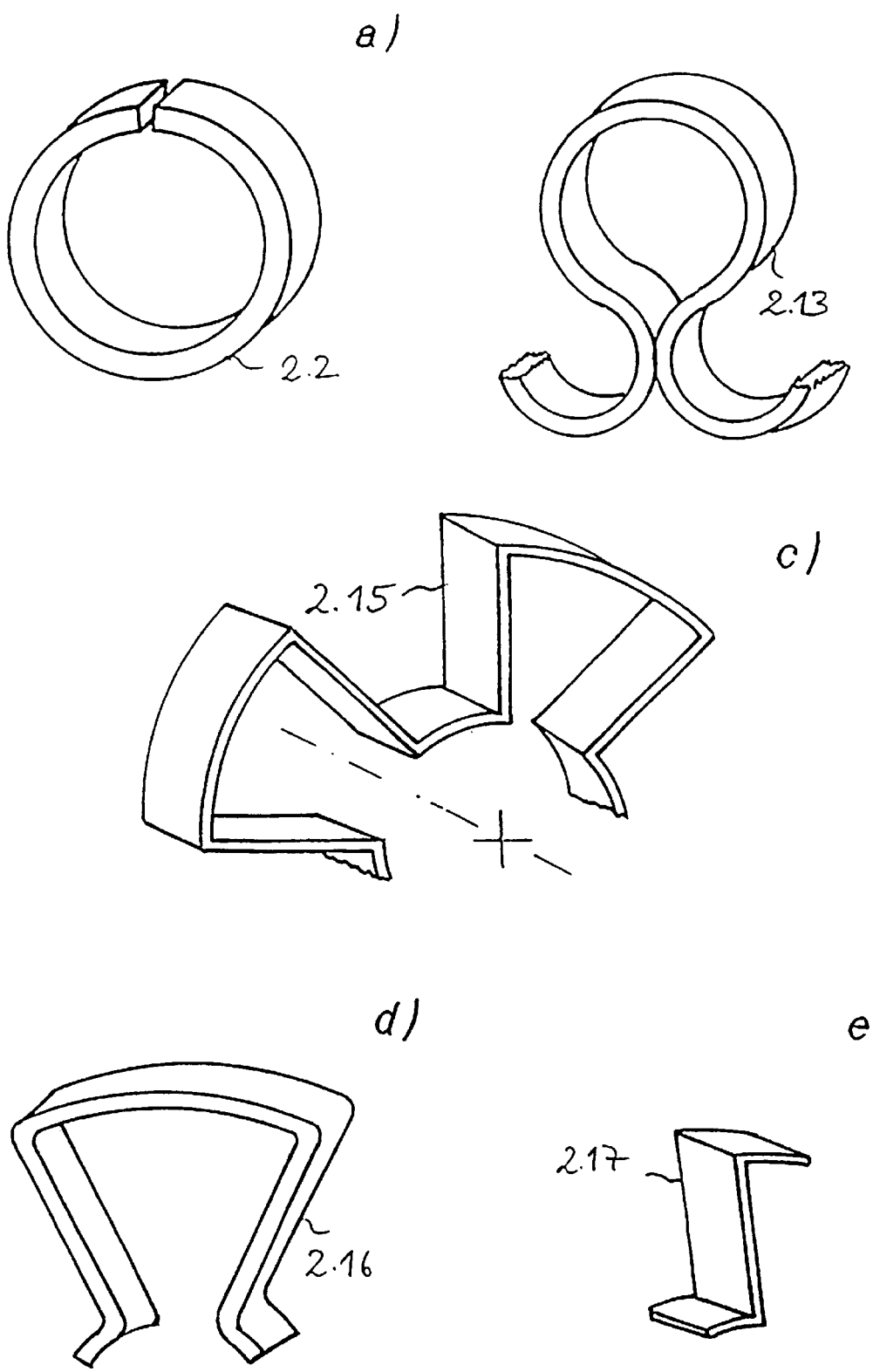
FIG. 6 Under a) to e) in perspective representation examples for profile elements or parts thereof, which are produced by rolling and/or bending from flat profile sections or flat stampings.
Figure 7:
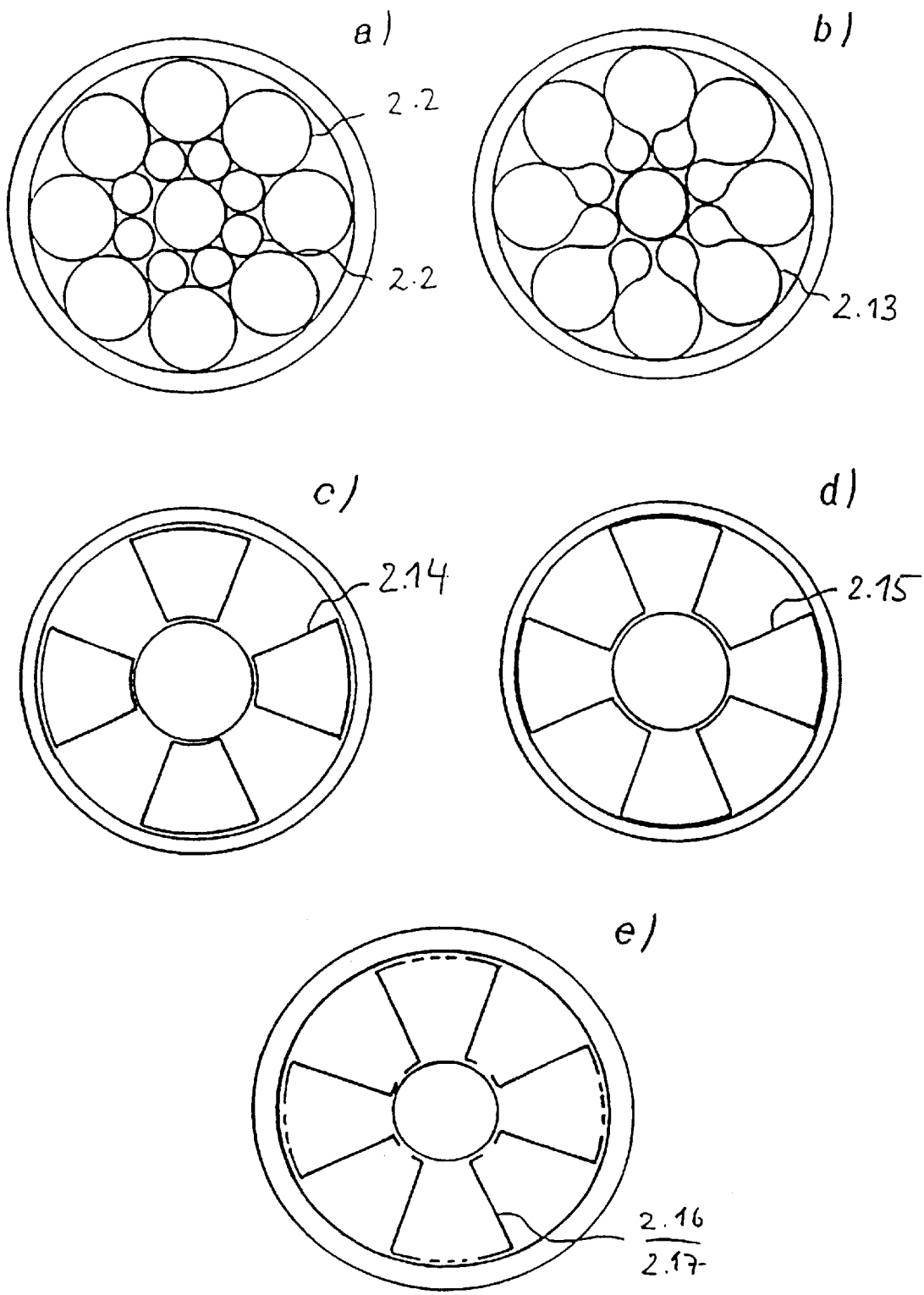
FIG. 7 Under a) to e) diagrammatic embodiments of inventive wheel structures, manufacturable using profile elements according to FIG. 6.

FIG. 7 shows under a) to e) embodiments of inventive wheel structures, which can in particular, but not exclusively, be produced using profile elements according to FIG. 6.

Thus, FIG. 7a) shows an embodiment with annular profile elements 2.2, which are either individually cut to length from a hollow profile with a circular cross-section or rolled from flat material according to FIG. 6a). There is in particular an outer rim of eight larger rings and an inner rim of eight smaller rings. An optically substantially identical embodiment is shown for direct comparison purposes in FIG. 7b), but here, in place of the individual rings, there is a through, quasi-continuous, looped flat profile 2.13 according to FIG. 6b).

In the imbodiment of FIG. 7c) there are four profile elements 2.14, which can once again be cut to length from a hollow profile or produced from a flat material. An optically very similar embodiment using a through, quasi-continuous, multiply bent flat material 2.15 according to FIG. 6c) is shown in FIG. 7d).

FIG. 7e) shows an example, in which the continuous flat material 2.15 of FIG. 7d) is subdivided into several, in each case open profile elements 2.16 according to FIG. 6d) or even into hook-shaped profile elements 2.17 according to FIG. 6e).

Figure 8:
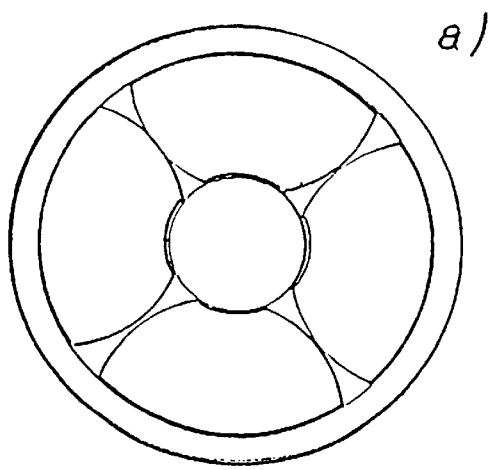
FIG. 8 Under a) to e) diagrammatically further embodiments of inventive wheel structures, manufacturable using flat profiles or stampings.
Figure 8:
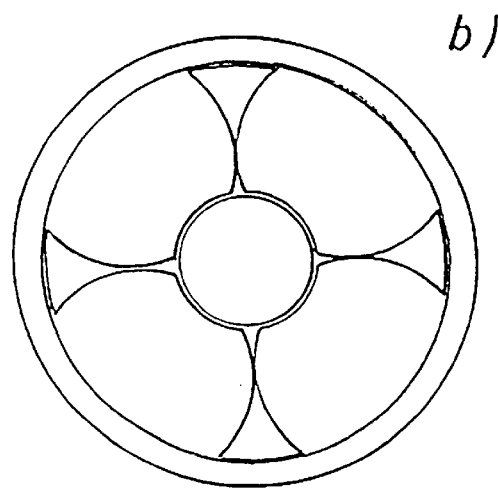
Figure 8:
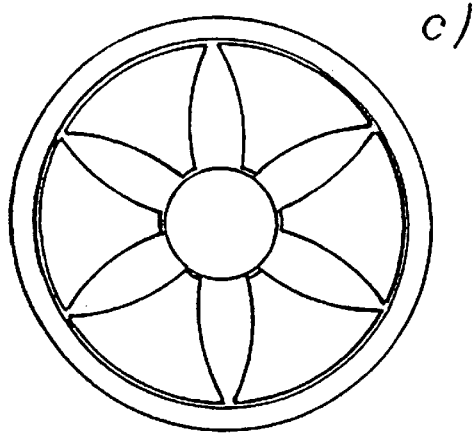
Figure 8:
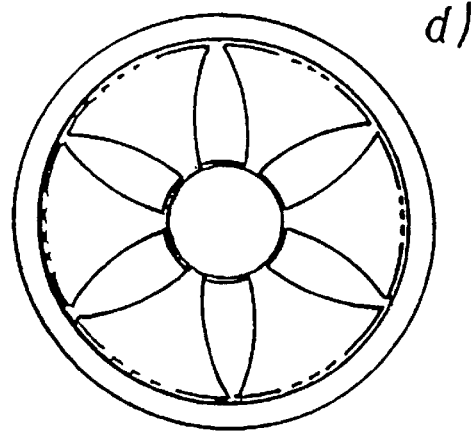
Figure 8:
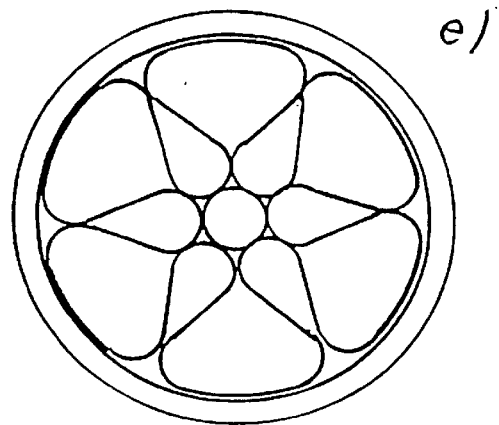

Under a) to e), FIG. 8 illustrates further examples, in which the aforementioned constructional forms are modified in some way or the other, but without leaving the scope of the invention.

Figure 9:
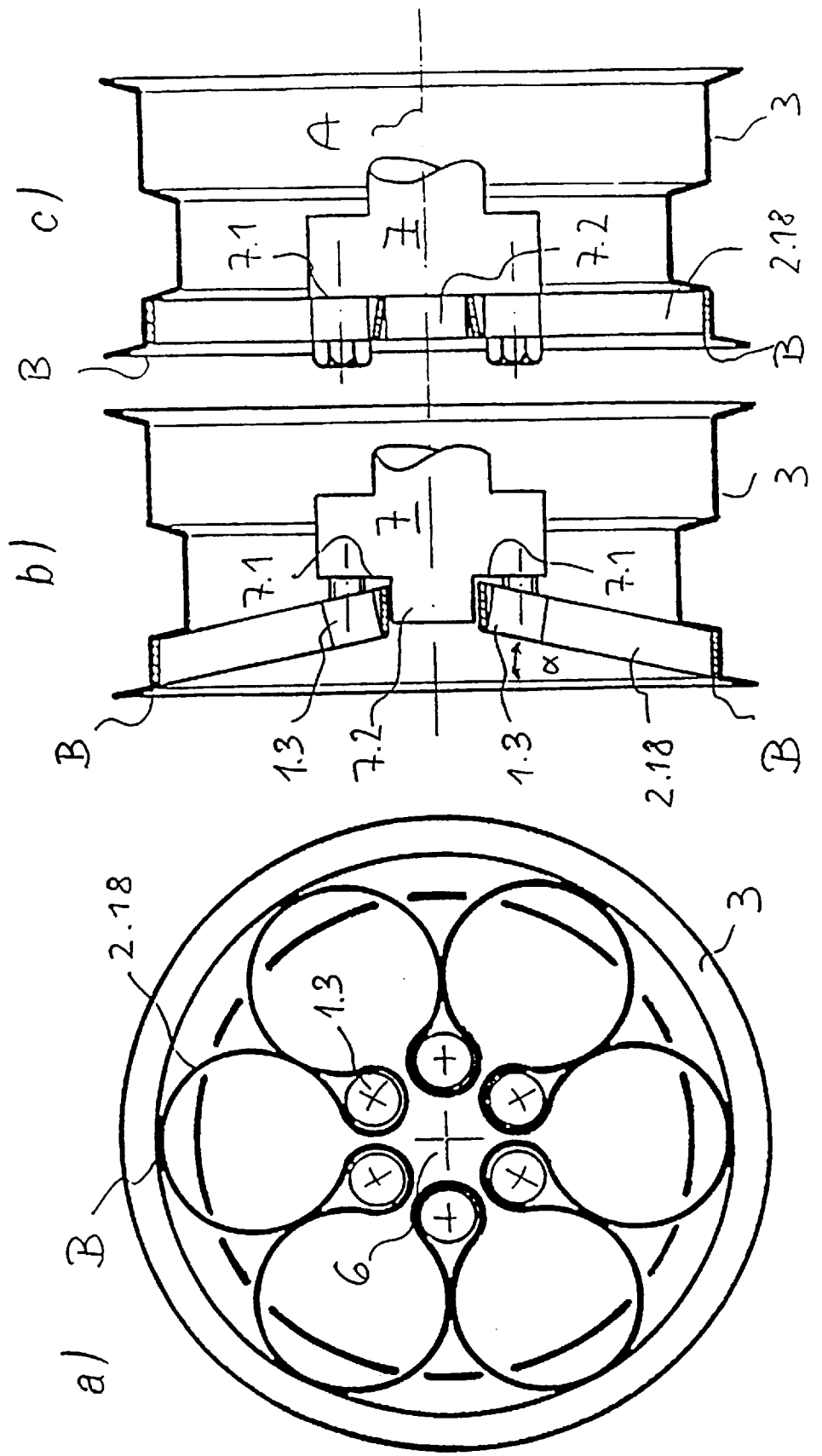
FIG. 9 Under a) to c) an embodiment derived from that according to FIG. 7b) and in which on fitting or in the fitted state a preloading or initial tension is obtained in the wheel structure.

FIG. 9 shows under a) to c) an embodiment derived from that according to FIG. 7b). As can be gathered from FIG. 9a), the circular hub 1 of FIG. 7b) has been replaced by perforated disks 1.2, which are welded into the inner loops of the flat profile 2.18. The loops or perforated disks 1.3 frame in circular manner a central opening 6.

The sectional representation of FIG. 9b) shows that the faces of the flat profile 2.18 are at an angle α (shown in exaggerated form) with respect to the axial direction A, the perforated disks 1.3 being oriented parallel to the faces. At least at the points, one of which is designated as B, the flat profile 2.18 is welded to the rim 3. At the opposite contact points of adjacent loops of the flat profile 2.18, it is possible, but not necessary to provide an additional connection.

If the thus constructed structure is screwed to an axle structure, which, as is only diagrammatically shown in FIGS. 9b) and c), with an only partly shown axle structure 7, has engagement faces 7.1 oriented perpendicular to the axial direction A, as well as a central axle journal 7.2, the flat profiles 2.18 are pressed or drawn with respect to the orientation of their faces in a position perpendicular to the axial direction A, as shown in FIG. 9c). In this position the complete structure is compressively loaded.

The welded joints B are also compressively loaded, which is particularly important with regards to the cyclic loading occurring when travelling. In addition, the pressing of the flat profiles 2.18 into the position according to FIG. 9c) leads to a constriction of the central opening 6 in the manner of a chuck. With suitable dimensioning of this opening 7 relative to the diameter of the central journal 7.2 of the axle structure 7, this constriction can be utilized for mid-centring with respect to the axis A.

In the embodiment of FIG. 9 the ultimate stiffness of the overall wheel structure is only obtained in the ready-to-travel, fitted state, the axle structure 7 functionally contributing to the overall structure and stiffness. The axle structure 7 could be here considered as a hub or at least as its axle-side part with the perforated disks 1.3 as its wheel-side part.

Figure 10:
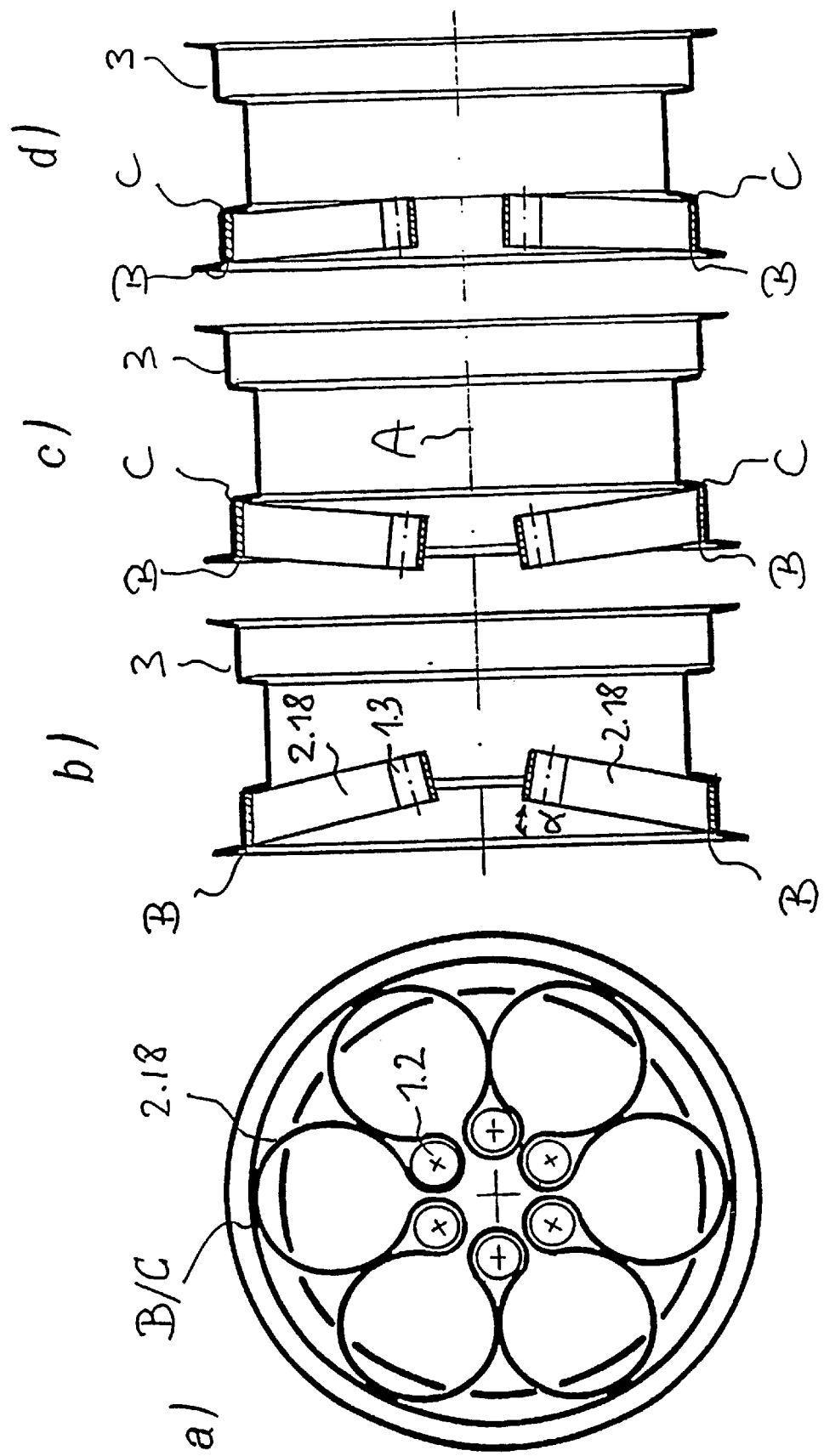
FIG. 10 Under a) to d) a further embodiment in which a preloading is also present in the unfitted state.

In the embodiment of FIG. 10, apart from the compressively loaded, externally located welded joints B, there could be internal welded joints, whereof one is designated C. These welded joints C are also compressively preloaded. In a first step the welded joint B only is brought into the stress-free state of the flat profiles 2.18 according to FIG. 10b), the faces of the flat profiles once again being inclined inwards under an angle α with respect to the axial direction A. Subsequently the flat profiles 2.18 are pressed outwards over and beyond their subsequently desired fitting position, the welded joints B being compressively preloaded. In this overpressed position shown in FIG. 10c), in a second step the welded joints C are installed. On springing back of the flat profiles 2.18 after axial relief, the welded joints C are also compressively preloaded. As a function of the preloading of both welded joints B and C the flat profiles 2.18 assume an equilibrium position, as shown in exemplified manner in FIG. 10d). The equilibrium position can, but need not correspond to the final, desired fitting position. If the faces of the flat profiles in the equilibrium position are inclined with respect to the axial direction A, here again the above-described chuck and centring effect can be utilized.

Figure 11:
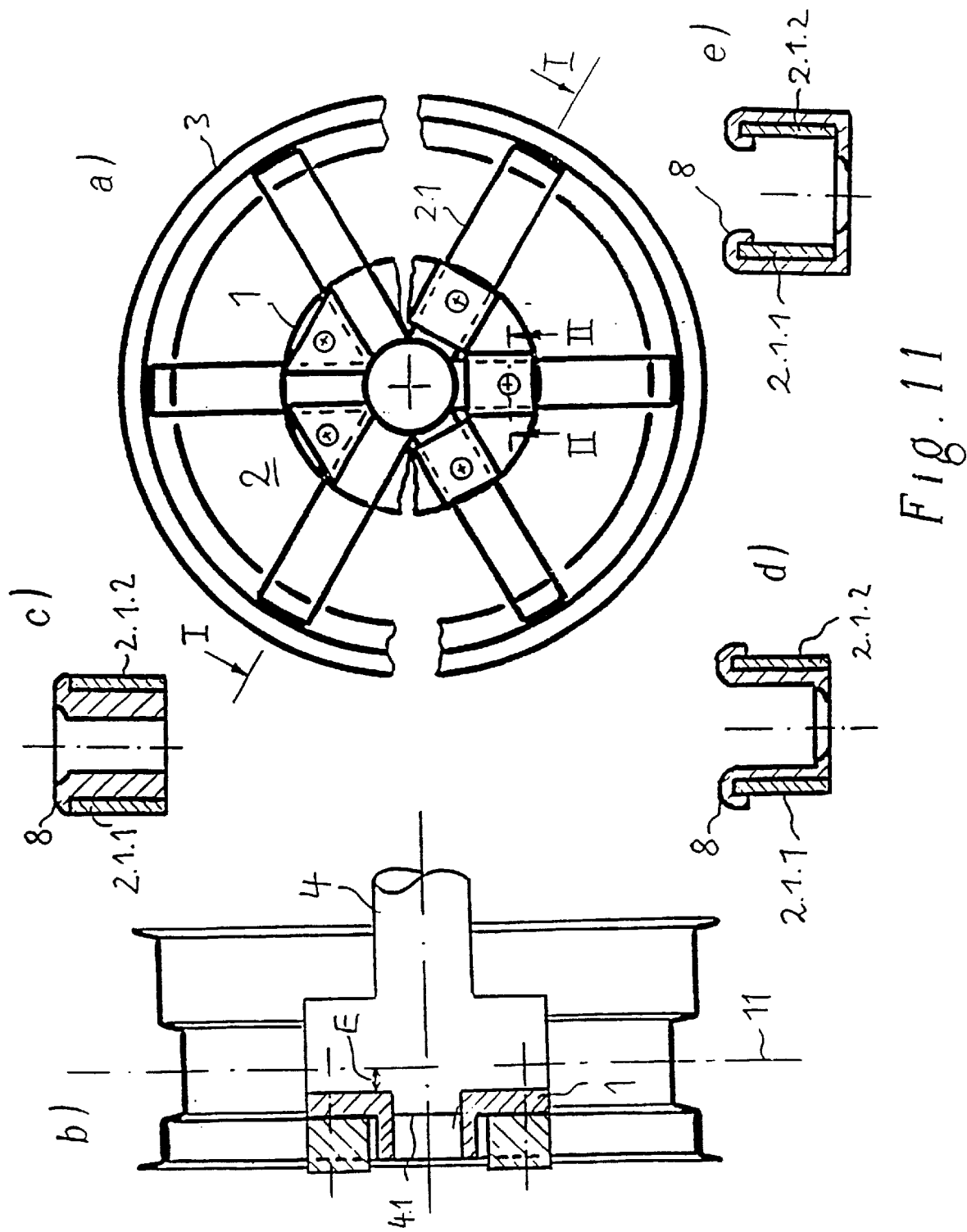
FIG. 11 Under a) a view and under b) a section I—I of an embodiment, in which the hub is replaceable and under c) to e) retaining elements for the connection of the profile elements to the hub.

The embodiment of FIG. 11 largely corresponds to that of FIG. 1, except that here the hub 1 is constructed as a replaceable part and the u-shaped profiles 2.1 are not fixed, but instead detachably connected thereto. The reason for this construction is in the centring of car wheels on the midcentring 4.1 of the axle structure 4, whose quantity varies from manufacturer to manufacturer. An otherwise identical wheel cannot consequently easily be used for different car types. This makes it necessary for the wheel manufacturer to have a considerable multiplicity of types and for dealers and workshops to keep extensive stocks. In the embodiment of FIG. 11 for adaptation to a specific car type or a particular manufacturer's standard, advantageously only the hub 1 has to be correspondingly chosen or replaced.

Another advantage of the replaceability of the hub 1 is the possibility of modifying the so-called inset E of the wheel. The inset E is codeterminative for the vehicle track width. It is obvious that the inset E can be modified by varying the axial thickness of the replaceable hub 1.

For the detachable connection of the ends of the sides 2.1.1 and 2.2.2 of the u-shaped profile elements 2.1 with the replaceable hub 1 and generally for fixing the position of said sides, as in the embodiments of FIG. 2, holding or retaining elements 8 are provided, which are fitted between the side ends or embrace the same from the outside, as shown in FIG. 11 under c) to e) in section. The retaining elements 8 can be associated with the sides of the same u-profile elements (FIG. 11a), bottom) or the sides of adjacent profile elements (FIG. 11a), top).

It is again stressed at this point, that with the above-described embodiments the desired high stiffness, particularly with respect to rotating bending moments, is inter alia achieved through axially, relatively extensive contact faces or lines of the profile elements with the hub 1 on the one hand and the rim 3 on the other. The profile elements are consequently quasi "clamped" between the hub 1 and rim 3 and in the radial direction even partly additionally engage on outward shapes of said elements, such as e.g. on the ring flange-like part 1.1 of hub 1 in FIG. 1. In this way the inherent stiffness of hub 1 and rim 3 is incorporated in optimum manner into the stiffness of the overall structure.

The above embodiments are to be understood in a non-limitative manner and merely illustrate but within the scope of the inventive idea in simple manner numerous constructions and forms can be implemented. The aforementioned embodiments are naturally combinable with one another and with other things. Their arrangement within the scope of the above description is not prescribed, so that certain minor variants can have an independent inventive quality. This e.g. applies to the embodiments of FIGS. 9 and 10 with respect to the preloading of the welded joints or the mid-centring by constriction or the embodiment with a replaceable hub according to FIG. 11. The embodiments of FIGS. 9 to 11 are also not restricted to the use of rolled or bent flat profiles.

Figure 12:
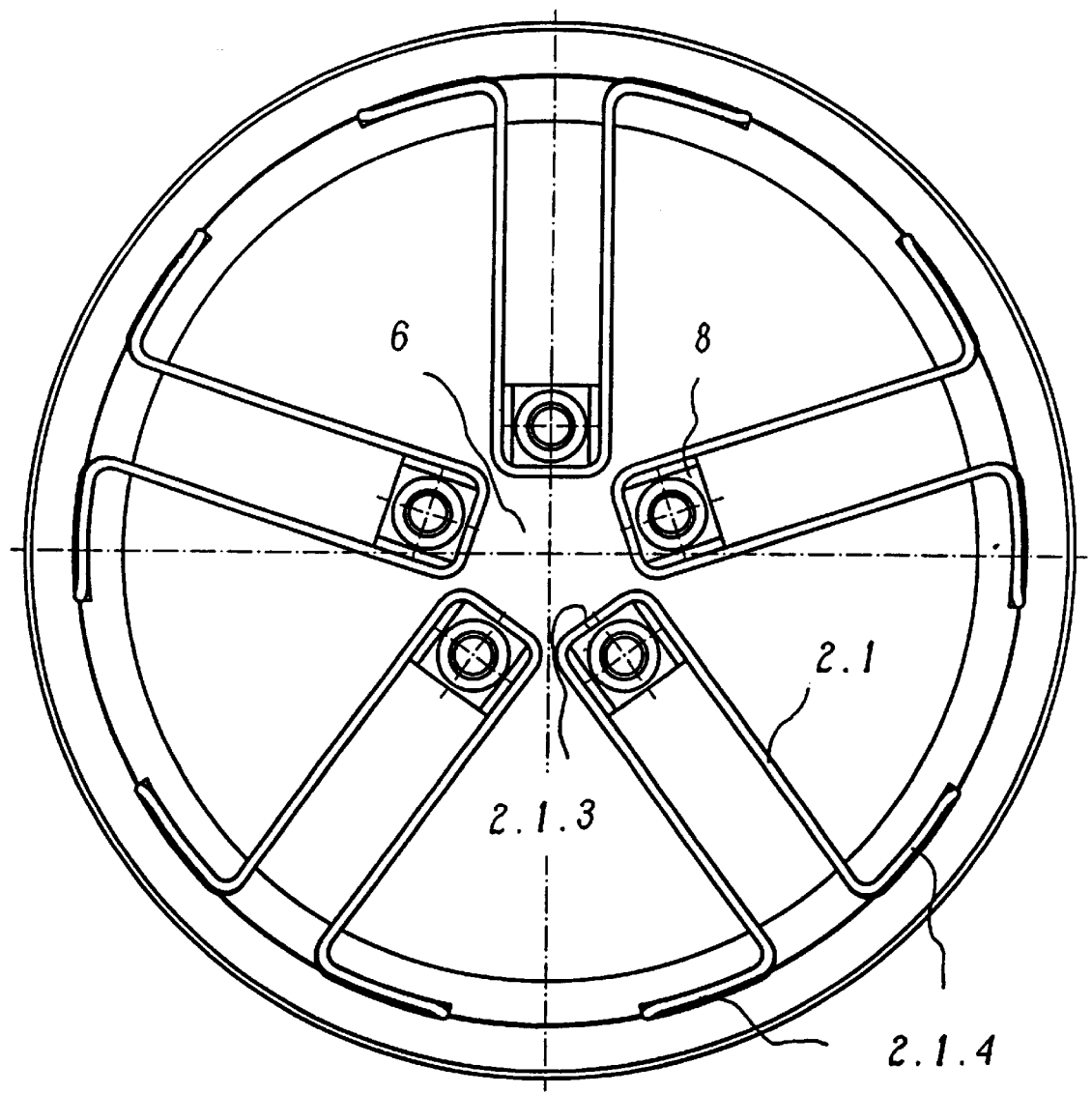
FIG. 12 A view of an embodiment, in which a hub is omitted at all.

The embodiment of FIG. 12 largely corresponds to that of FIG. 11, except that here a hub as a specific part is omitted at all and that the u-shaped profiles 2.1 are of the type as already shown in FIG. 6d) or FIG. 8d). That means on the one hand that the connecting web 2.1.3 of the u-shaped profiles 2.1 is respectively oriented towards the central opening 6 of the wheel structure and that on the other hand end sections 2.1.4 of the u-shaped profiles 2.1 are respectively bend outward away from each to form some kind of foot parts engaging on the rim inside. As in the embodiment of FIG. 11 holding or retaining elements 8 are provided. Such elements may be of the type as shown in FIG. 11c), 11d) or 11e), respectively, and are used here for the detachable connection of the u-shaped profiles or, more specifically, of their central part (including and adjacent to the connecting web 2.3.1), directly to an axle structure such as the axle structure 7 of FIG. 9.

In the embodiment of FIG. 12, like in the embodiment of FIG. 9, the ultimate stiffness of the overall wheel structure is only obtained in a ready-to-travel, fitted state, the axle structure functionally contributing to the overall structure and stiffness. The axle structure could be here again be considered as a hub or at least as its axle side part with the holding elements 8 as its wheel side part.

Figure 13:
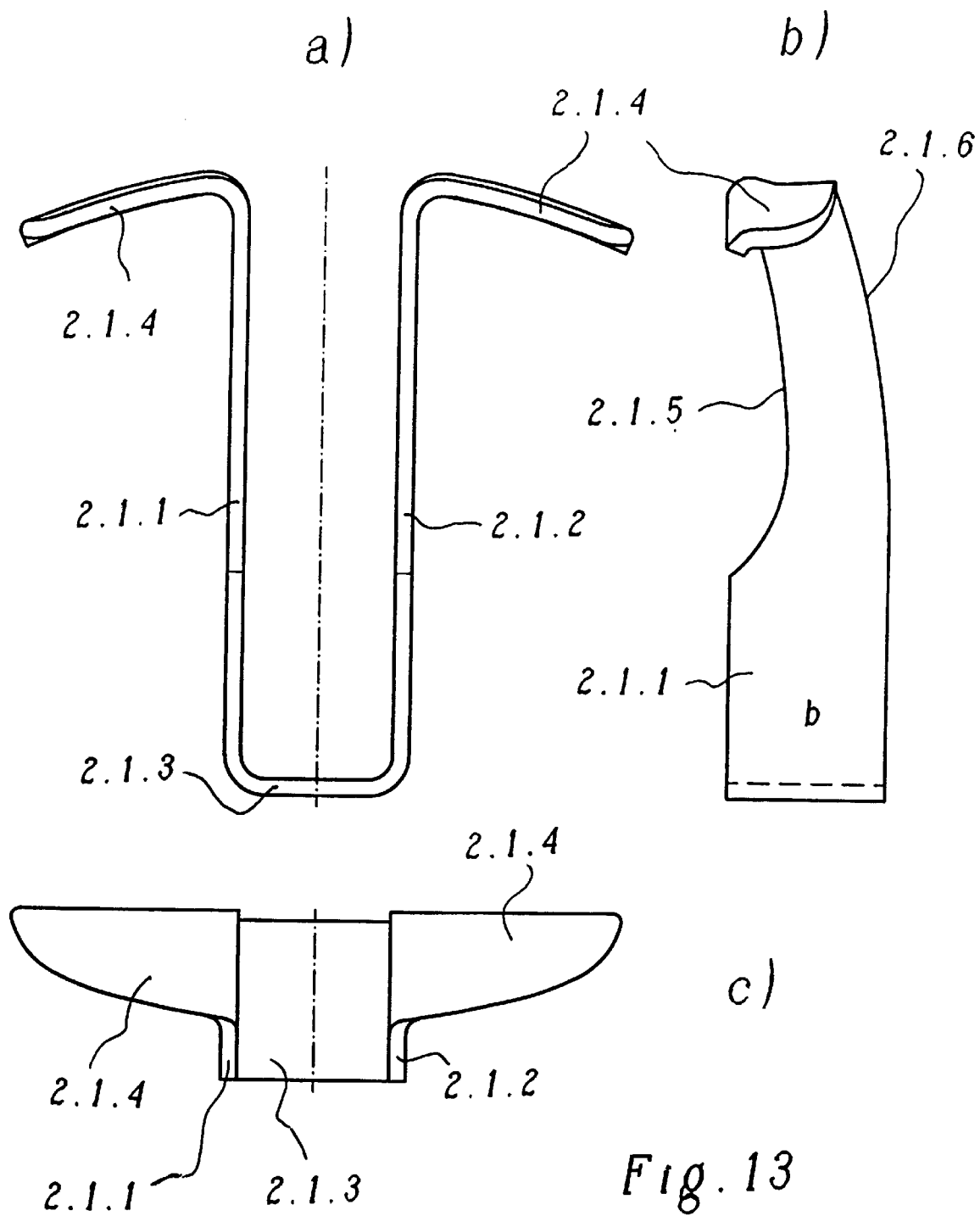
FIG. 13 Under a)–c) details of a preferred embodiment of the u-shaped profile elements of FIG. 12, whereby FIG. 13a) is a front view, FIG. 13b) is a side view and FIG. 13c) is a top view of one such profile element.
Figure 14:
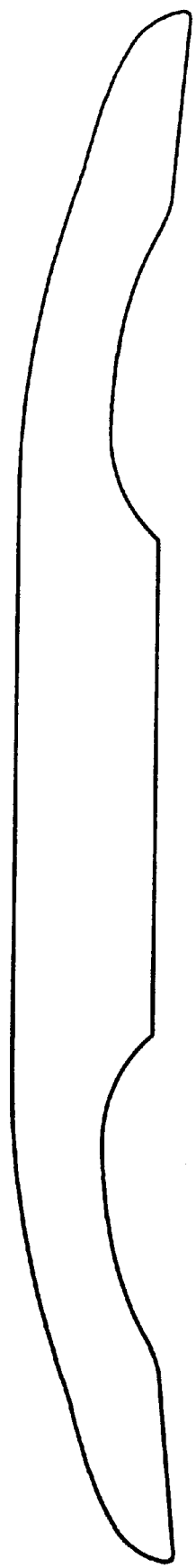
FIG. 14 A flat stamping from which the profile element of FIG. 13 may be manufactured by bending.

Under a)–c), FIG. 13 shows further details of a preferred embodiment of the u-shaped profile elements 2.1 of FIG. 12, whereby FIG. 13a) is a front view, FIG. 13b) a side view and FIG. 13c) a top view of one such profile element 2.1. The profile element of FIG. 13 may be manufactured by bending from flat stampings such as the one as shown in FIG. 14.

As can be gathered from FIG. 13, the profile element 2.1 has a varying width b along its arms 2.1.1 and 2.1.2, respectively, which is greater at its central part including and adjacent to the connecting web 2.1.3 than at its opposite or outer part adjacent to the outwardly bend sections 2.1.4. Even the width of such outwardly bend sections 2.1.4 is reduced towards its outer ends. By such variation of the width of the profile element the stiffness thereof is varied accordingly and is thereby adapted to the varying loads and stiffness requirements of the wheel structure in the radial direction. Holding elements 8 act as further stiffening means for the central part of the profile elements.

As can be gathered from FIG. 13b) the axial end faces of profile element 2.1 are bend to hereby take account for the space requirements for brake shoes or disc breaks. As can be further gathered from FIG. 13, parts 2.1.4 are not only bend outwardly but can also be bend or formed into a three dimensional form to thereby optimally fit with the rim inside.

A very strong connection between the rim and parts 2.1.4 is achieved by welding parts 2.1.4 to the rim along the outer periphery of parts 2.1.4.

What is claimed is:

1. A wheel structure to be fitted directly to an axle structure of a vehicle without a hub therebetween, the wheel structure comprising:
   a rim and a spoke system, wherein the spoke system has at least one profile element for transmitting forces directly between the axle structure and the rim;
   wherein said wheel structure has a first stiffness in an unmounted state such that the wheel structure is deformable by forces and torques acting on the wheel structure and a second, ultimate stiffness that is only obtained when the spoke system is mounted to the axle structure such that the wheel structure is substantially undeformable by forces and torques acting on the wheel structure.

2. The wheel structure of claim 1, wherein at least one holding or retaining element is provided for a detachable connection of the at least one profile element to the axle structure.

3. The wheel structure of claim 2, wherein the at least one holding or retaining element comprises a perforated disc.

4. The wheel structure of claim 2, wherein the at least one profile element has sides and wherein the at least one holding or retaining element is fitted between such sides.

5. The wheel structure of claim 2, wherein the at least one profile element has sides and wherein the at least one holding or retaining element embraces such sides.

6. The wheel structure of claim 2, wherein at least two profile elements are provided adjacent to each other and wherein the at least one holding or retaining element is associated with both such profile elements.

7. The wheel structure of claim 1, wherein the at least one profile element is welded to the rim.

8. The wheel structure of claim 1, wherein the at least one profile element has been cut to length from profile.

9. The wheel structure of claim 1, wherein the at least one profile element is a flat profile section that has been rolled, bent and/or forged into shape.

10. The wheel structure of claim 1, wherein the at least one profile element is considerably u-shaped.

11. The wheel structure of claim 10, wherein the considerably u-shaped profile element has a connecting web engaging the axle structure.

12. The wheel structure of claim 11, wherein the considerably u-shaped profile element has two sides and wherein end sections of such sides are bent away from each other.

13. The wheel structure of claim 12, wherein the rim has a structured inside and wherein the end sections engage such structured rim inside.

14. The wheel structure of claim 1, wherein the axle structure comprises a removable plate to which the spokes are attached.

15. The wheel structure of claim 1, wherein said at least one profile element is detachably connectable to the axle structure, is formed at least partly from steel, a light metal or a light metal alloy having a uniformly aligned crystal structure each, has a width in the axial direction, and has a thickness in the radial direction;
   wherein said width is considerably larger than said thickness; and
   wherein said wheel structure has an axial direction and a circumferential direction.

16. The wheel structure of claim 1, wherein the spoke system spans the majority of a distance between the rim and a radial center of the wheel structure.

17. The wheel structure of claim 1, wherein said at least one profile element has a pair of spokes substantially parallel to a radius of the wheel structure.

18. The wheel structure of claim 1, wherein a radially inner portion of the at least one profile element is free.

19. The wheel structure of claim 1, wherein a radially inner portion of the at least one profile element connects to the axle structure.

20. A wheel structure to be fitted to an axle structure of a vehicle, the wheel structure comprising:
   a rim and a spoke system, wherein the spoke system has at least one profile element for transmitting forces between the axle structure and the rim;
   wherein said wheel structure has an axial direction and a circumferential direction;
   wherein said wheel structure has an ultimate stiffness, said ultimate stiffness being only obtained in a ready-to-travel, fitted state;
   wherein said at least one profile element is detachably connectable to the axle structure, is formed at least partly from steel, a light metal or a light metal alloy having a uniformly aligned crystal structure each, has a width in the axial direction, and has a thickness in the radial direction;
   wherein said width is considerably larger than said thickness;
   wherein at least one holding or retaining element is provided for a detachable connection of the at least one profile element to the axle structure; and
   wherein the at least one holding or retaining element is welded to the at least one profile element.

21. A wheel structure to be fitted to an axle structure of a vehicle, the wheel structure comprising:
   a rim and a spoke system, wherein the spoke system has at least one profile element for transmitting forces between the axle structure and the rim;
   wherein said wheel structure has a first stiffness in an unmounted state such that the wheel structure is deformable by forces and torques acting on the wheel structure and a second, ultimate stiffness that is only obtained when the spoke system is mounted to the axle structure such that the wheel structure is substantially undeformable by forces and torques acting on the wheel structure,
   wherein at least one holding or retaining element is provided for a detachable connection of the at least one profile element to the axle structure, and
   wherein the at least one holding or retaining element is welded to the at least one profile element.

22. A wheel and axle structure comprising:
   a spoke system,
   a rim, and
   an axle system,
   wherein the radially outer portion of the spoke system is connected to the rim, and the radially inner portion is connected directly to the axle system;
   wherein the spoke system has at least one profile element for transmitting forces directly between the axle system and the rim;
   wherein said wheel and axle structure has an ultimate stiffness, obtained by mounting the spoke system to the axle system such that the wheel and axle structure is substantially undeformable by forces and torques acting on the wheel and axle structure;
   wherein said at least one profile element is detachably connected to the axle system.

23. A wheel structure to be fitted directly to an axle structure of a vehicle, the wheel structure comprising:
   a rim; and
   a spoke system having at least one profile element for transmitting forces directly between the axle structure and the rim and a radially inner portion to be detachably connectable to the axle structure; and
   wherein the radially inner portion of the at least one profile element is free.

24. A wheel structure to be fitted to an axle structure of a vehicle, the wheel structure comprising:
   a rim and a spoke system, wherein the spoke system has at least one profile element for transmitting forces between the axle structure and the rim;
   wherein said wheel structure has an axial direction and a circumferential direction;
   wherein said wheel structure has an ultimate stiffness, said ultimate stiffness being only obtained in a ready-to-travel, fitted state;
   wherein said at least one profile element is detachably connectable to the axle structure, is formed at least partly from steel, a light metal or a light metal alloy having a uniformly aligned crystal structure each, has a width in the axial direction, and has a thickness in the radial direction;

wherein said width is considerably larger than said thickness;

wherein at least one holding or retaining element is provided for a detachable connection of the at least one profile element to the axle structure; and wherein the at least one profile element is considerably u-shaped and has a connecting web engaging the axle structure.

25. The wheel structure of claim 24, wherein said at least one profile element has a pair of spokes substantially parallel to a radius of the wheel structure.

* * * * *